United States Patent
Firby et al.

(10) Patent No.: US 11,257,490 B2
(45) Date of Patent: Feb. 22, 2022

(54) DEVICE IDENTIFICATION THROUGH DIALOG

(71) Applicant: Intel Corporation, Santa Clara, CA (US)

(72) Inventors: Robert James Firby, San Mateo, CA (US); Jesus Gonzalez Marti, Seville (ES); Jose Gabriel De Amores Carredano, Seville (ES); Martin Henk Van Den Berg, Palo Alto, CA (US); Maria Pilar Manchon Portillo, Los Altos, CA (US); Guillermo Perez, Seville (ES); Steven Thomas Holmes, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 16/090,187

(22) PCT Filed: Apr. 1, 2016

(86) PCT No.: PCT/EP2016/057292
§ 371 (c)(1),
(2) Date: Sep. 28, 2018

(87) PCT Pub. No.: WO2017/167406
PCT Pub. Date: Oct. 5, 2017

(65) Prior Publication Data
US 2019/0115022 A1    Apr. 18, 2019

(51) Int. Cl.
*G10L 15/22* (2006.01)
*H04L 29/08* (2006.01)
(Continued)

(52) U.S. Cl.
CPC ............ *G10L 15/22* (2013.01); *G10L 15/083* (2013.01); *H04L 67/125* (2013.01); *H04W 4/80* (2018.02);
(Continued)

(58) Field of Classification Search
CPC .............................. G10L 15/22; H04L 29/08
See application file for complete search history.

(56) References Cited

U.S. PATENT DOCUMENTS 9,443,527 B1 * 9/2016 Watanabe ............... G10L 15/22
9,606,762 B2   3/2017 Oishi
(Continued)

FOREIGN PATENT DOCUMENTS

EP    1959629 A1    8/2008
JP    2007067723 A   3/2007
(Continued)

OTHER PUBLICATIONS

International Search Report issued in PCT Application No. PCT/EP2016/057292 dated Jul. 8, 2016; 11 pages.
(Continued)

*Primary Examiner* — Michael N Opsasnick
(74) *Attorney, Agent, or Firm* — Patent Capital Group (57) ABSTRACT

Particular embodiments described herein provide for an electronic device that can be configured to receive a verbal command to active a device with an unknown label, derive a probable device and a label for the probable device, activate the probable device, determine that the activated probable device is the same device to be activated by the verbal command, and store the label and a description for the device. In some examples, the label is associated with the description.

19 Claims, 7 Drawing Sheets

(51) Int. Cl.
*H04W 4/80* (2018.01)
*H04L 67/125* (2022.01)
*G10L 15/08* (2006.01)

(52) U.S. Cl.
CPC .. *G10L 2015/223* (2013.01); *G10L 2015/228* (2013.01)

(56) References Cited

U.S. PATENT DOCUMENTS

| | | | | |
|---|---|---|---|---|
| 2003/0172271 A1* | 9/2003 | Silvester | ............ | H04W 12/003 713/170 |
| 2007/0055760 A1* | 3/2007 | McCoy | ................... | H04L 41/22 709/223 |
| 2007/0143440 A1* | 6/2007 | Reckamp | ............ | H04L 12/2814 709/217 |
| 2011/0300840 A1 | 12/2011 | Basir | | |
| 2012/0109383 A1* | 5/2012 | Richards | ................. | F24F 11/30 700/275 |
| 2015/0006184 A1* | 1/2015 | Marti | ...................... | G10L 15/22 704/275 |
| 2015/0100313 A1* | 4/2015 | Sharma | ................... | G06F 3/167 704/235 |
| 2015/0154976 A1 | 6/2015 | Mutagi | | |
| 2016/0080486 A1* | 3/2016 | Ram | ................... | H04L 12/1822 709/205 |
| 2018/0061419 A1* | 3/2018 | Melendo Casado | .... | G10L 15/30 |

FOREIGN PATENT DOCUMENTS

| | | |
|---|---|---|
| JP | 2011199770 A | 10/2011 |
| JP | 2012095266 A | 5/2012 |
| WO | 2001003402 A1 | 1/2001 |
| WO | 2006045402 A1 | 5/2006 |
| WO | 2012118045 A1 | 9/2012 |

OTHER PUBLICATIONS

JP 2021-1-21 Notice of Allowance from Japanese Application JP2018-550500 [No translation available].

* cited by examiner

DEVICE IDENTIFICATION THROUGH DIALOG

CROSS-REFERENCE TO RELATED APPLICATION

This application is a national stage application under 35 U.S.C. § 371 of PCT International Application Serial No. PCT/EP16/57292, filed on Apr. 1, 2016 and entitled "DEVICE IDENTIFICATION THROUGH DIALOG," which is hereby incorporated by reference in its entirety.

TECHNICAL FIELD

This disclosure relates in general to the field network communication, and more particularly, to device identification through dialog.

BACKGROUND

The Internet has enabled interconnection of different computer networks all over the world. In particular, the Internet provides a medium for exchanging data between different users connected to different computer networks. While the use of the Internet has transformed business and personal communications, it can also create confusion or frustration among some users. For example, for a user to start using a device, the device typically needs to be paired with a system through some interaction. When a new device is connected to the system, that device has to be identified as an instance of a particular type, ownership may need to be verified, and then control has to be taken by the system. Typically, this is done through a corresponding application or a web interface which some users find confusing and frustrating.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for device identification through dialog. Features such as structure(s), function(s), and/or characteristic(s), for example, are described with reference to one embodiment as a matter of convenience; various embodiments may be implemented with any suitable one or more of the described features.

Figure 1:
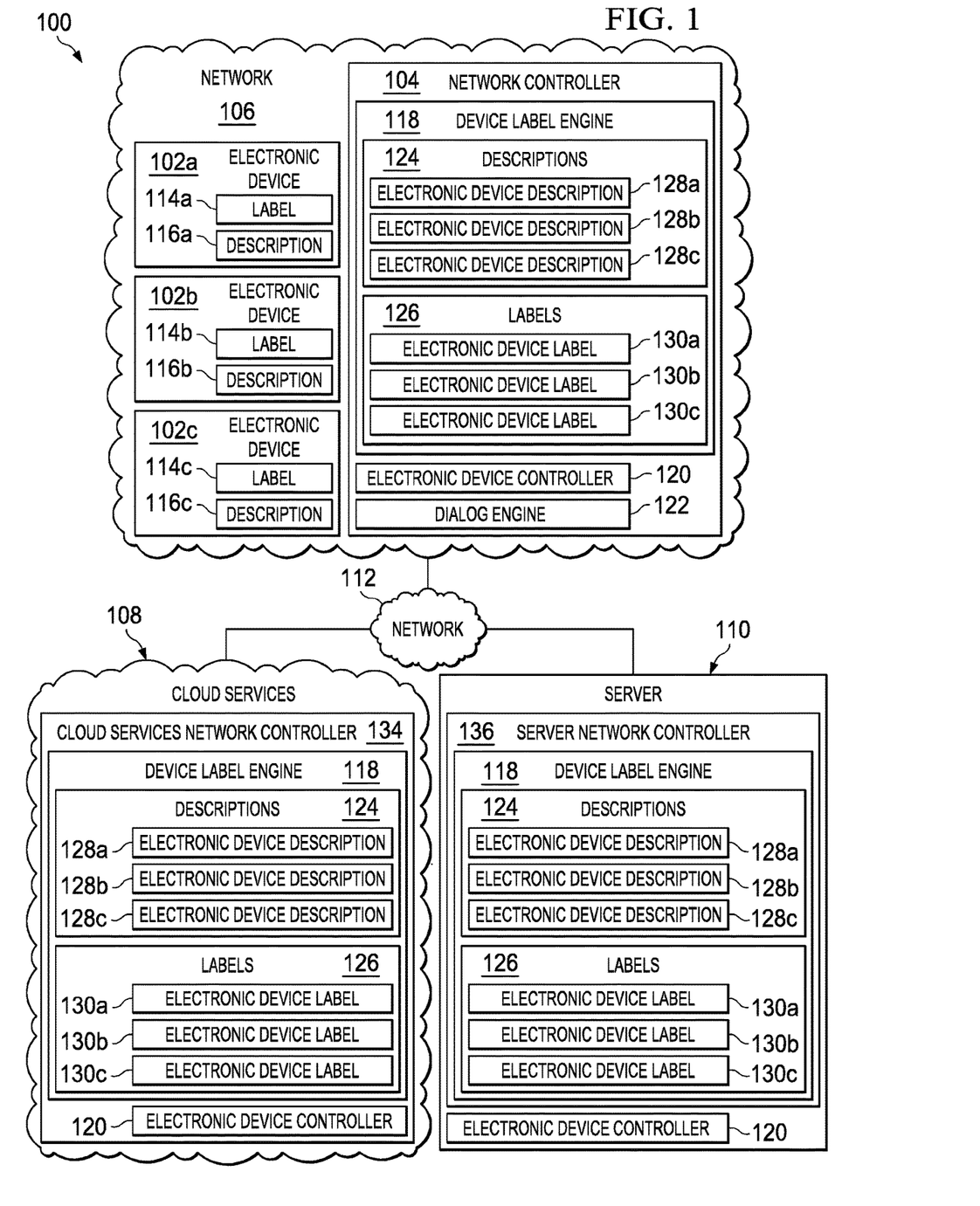
FIG. 1 is a simplified block diagram of a communication system for device identification through dialog in accordance with an embodiment of the present disclosure.

FIG. 1 is a simplified block diagram of a communication system 100 for device identification through dialog in accordance with an embodiment of the present disclosure. Communication system 100 can include one or more electronic devices 102a-102c, a network controller 104, cloud services 108, and a server 110. Electronic devices 102a-102c and network controller 104 can be in communication with each other using network 106. Electronic devices 102a-102c, network controller 104, cloud services 108, and server 110 can communicate with each other using network 112. Each electronic device 102a-102c can include a device data collection engine 110 and memory 112.

Each electronics device 102a-102c can include a label and a description. For example, electronic device 102a can include label 114a and description 116a, electronic device 102b can include label 114b and description 116b, and electronic device 102c can include label 114c and description 116c. Each label may be a label or name for the electronic device that uniquely identifies the electronic device. For example, label 114a may be a media access control (MAC) address, an IP address, or some other unique identifier that can identify electronic device 102a. In an example, label 114a is a unique identifier provided by electronic device 102a. Each description may be a description of the electronic device given to the electronic device by a user. For example, description 116a may include the description "lamp by the second kitchen window" for electronic device 102a.

Network controller 104 can includes a device label engine 118, labels 126, an electronic device controller 120, and a dialog engine 122. Device label engine 118 can include descriptions 124 and labels 126. Descriptions 124 can include electronic device descriptions 128a-128c. Each electronic device description in descriptions 124 can uniquely identify an electronic device. For example, electronic device description 128a may be the same as description 116a and identify electronic device 102a, electronic device description 128b may be the same as description 116b and identify electronic device 102b, and electronic device description 128c may be the same as description 116c and identify electronic device 102c. Labels 126 can include electronic device labels 130a-130c. Each electronic device label in labels 126 can identify an electronic device. For example, electronic device label 130a may be the same as label 114a and identify electronic device 102a, electronic device label 130b may be the same as label 114b and identify electronic device 102b, and electronic device label 130c may be the same as label 114c and identify electronic device 102c.

Electronic device controller 120 can be configured to control one or more electronic devices coupled to network 106 and network 112. For example, electronic device controller 120 can be configured to turn on and off electronic device 102a. Dialog engine 122 can be configured to recognize and interpret speech from a user.

Elements of FIG. 1 may be coupled to one another through one or more interfaces employing any suitable connections (wired or wireless), which provide viable pathways for network (e.g., network 106 and network 112) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In an example, communication system 100 can be configured to include a system that can be configured to receive a verbal command to active a device with an unknown description, derive a probable device and a label for the probable device, activate the probable device, determine that the activated probable device is the same device that the verbal command said to activate, and store a description for the device. The system can be further configured to store a label for the device, where the label is associated with the description. In another example, the system can determine a type associated with the device, where the probable device is at least partially derived from the type associated with the device and the possible label is at least partially derived from the verbal command.

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is the use of smart systems that help users in daily operations. In many cases these systems are designed to collect and process information about an object (either human or material item) in order to make or execute decisions. In addition, the Internet has enabled interconnection of different computer networks all over the world. While the use of the Internet has transformed business and personal communications, it can also create confusion or frustration among some users. For example, for a user to start using a device, the device typically needs to be paired with a system through some interaction. When a new device is connected to the system, that device has to be identified as an instance of a particular type, ownership may need to be verified, and then control needs to be taken by the system. Typically, this is done through a corresponding application or a web interface which some users find confusing or frustrating. What is needed is a system and method to grant anonymity of the information collected automatically from a group of users/devices in order to work out group related decisions.

A communication system for device identification through dialog, as outlined in FIG. 1, can resolve these issues (and others). Communication system 100 can be configured to recognize the existence of a new device and interrogate the user about ownership and connection needs in a natural, discursive way. In an example, the system can attempt to pair with the device and then verify if the device is the correct device and if it is functioning correctly. The pairing can be achieved through a dialogical interaction. In some examples, optional additional verification may be done, either to verify user access rights or for disambiguation purposes. If the user can change the state of the device, the system can ask the user to make such a state change to verify ownership. If this fails, the system can be configured to un-pair the device. In an example, if the device is a biometric monitor, the system may ask the user to perform an action to change the measured biometrics such as increase the heartrate or may ask the user to jump, wave their hand if the device is on a wrist, or some other action. In other examples, if the device can be switched on in some way (on/off, high/low), the system can ask the user to switch the device on or off.

Turning to the infrastructure of FIG. 1, communication system 100 in accordance with an example embodiment is shown. Generally, communication system 100 can be implemented in any type or topology of networks. Networks 106 and 112 represent a series of points or nodes of interconnected communication paths for receiving and transmitting packets of information that propagate through communication system 100. Networks 106 and 112 offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. In an example, network 106 is a LAN, wireless LAN, home area network (HAN), near-me area network (NAN), personal area network (PAN), or some other similar network.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-102c, network controller 104, cloud services 108, and server 110 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a-102c, network controller 104, cloud services 108, and server 110 can include memory elements for storing information to be used in the operations outlined herein. Each of electronic devices 102a-102c, network controller 104, cloud services 108, and server 110 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a-102c, network controller 104, cloud services 108, and server 110 may include software modules (e.g., device label engine 118, electronic device controller 120, dialog engine 122, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102c, network controller 104, cloud services 108, and server 110 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Each of electronic devices 102a-102c can be a network element and include, for example, desktop computers, laptop computers, mobile devices, personal digital assistants, smartphones, tablets, wearables, or other similar devices. Cloud services 108 is configured to provide cloud services to electronic devices 102a-102c. Cloud services 108 may generally be defined as the use of computing resources that are delivered as a service over a network, such as the Internet. The services may be distributed and separated to provide required support for electronic devices 102a-102c and cloud services 108. Typically, compute, storage, and network resources are offered in a cloud infrastructure, effectively shifting the workload from a local network to the cloud network. Server 110 can be a network element such as a server or virtual server and can be associated with clients, customers, endpoints, or end users wishing to initiate a communication in communication system 100 via some network (e.g., network 112). The term 'server' is inclusive of devices used to serve the requests of clients and/or perform some computational task on behalf of clients within communication system 100. Although device label engine 118 and dialog engine 122 are represented in FIG. 1 as being located in network controller 104, cloud services 108, and server 110, this is for illustrative purposes only. Device label engine 118 and dialog engine 122 could be combined or separated in any suitable configuration. Furthermore, device label engine 118 and dialog engine 122 could be integrated with or distributed in another network accessible by one or more of electronic devices 102a-102c.

Figure 2:
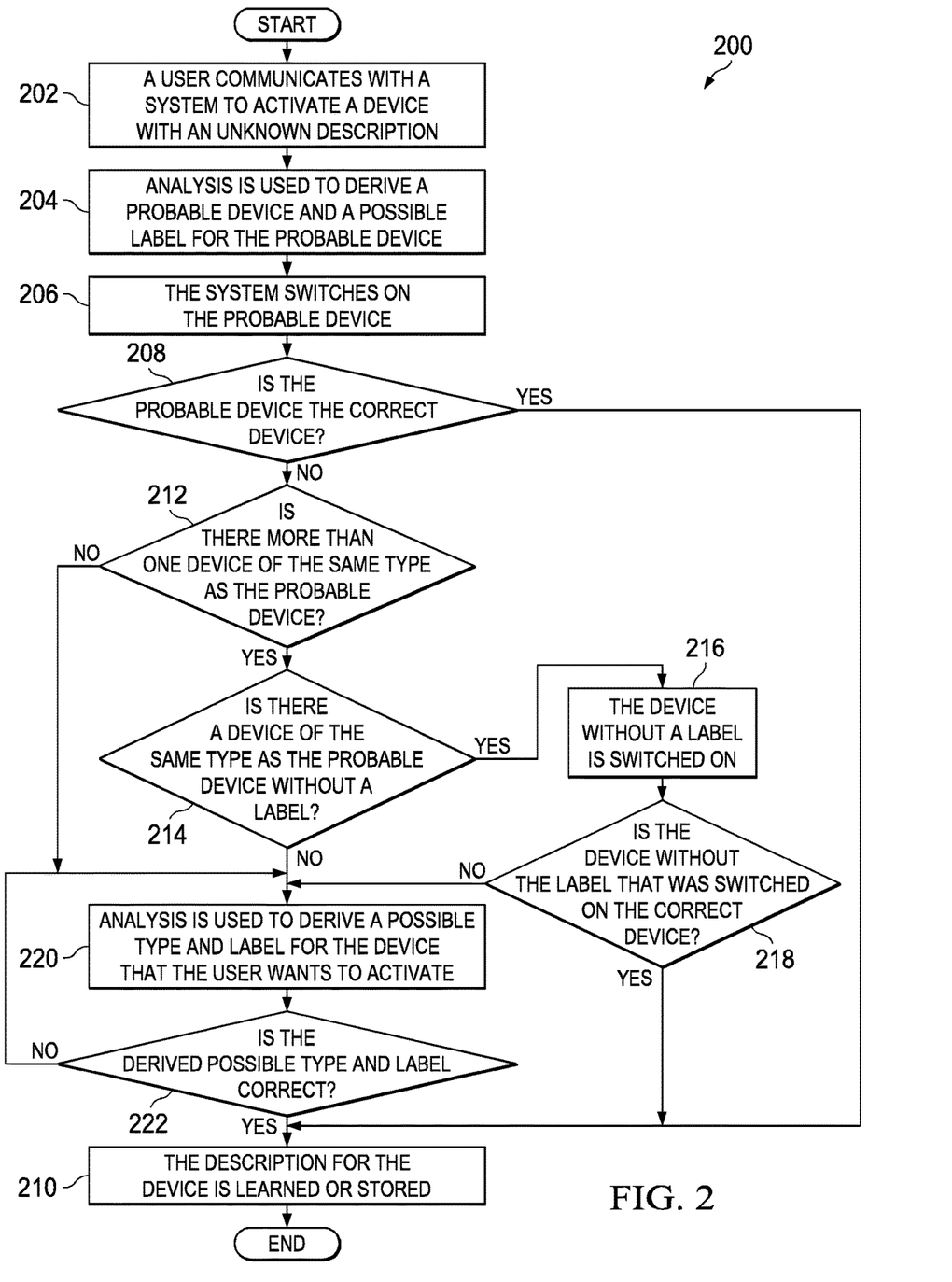
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with device identification through dialog, in accordance with an embodiment. In an embodiment, one or more operations of flow 200 may be performed by one or more of network controller 104, cloud services network controller 134, and server network controller 136. At 202, a user communicates with a system to activate a device with an unknown description. In an example, the communication is a verbal communication. At 204, analysis is used to derive a probable device and a possible label for the probable device. In one instance, the probable device can be a device connected or coupled to the system that the system has determined that the user wants to activate. At 206, the system switches on the probable device. At 208, the system determines if the probable device is the correct device. For example, the user may verbally confirm that the correct device was switched on. If the probable device is the correct device, then the description for the device is learned or stored, as in 210. If the probable device is not the correct device, then the system determines if there is more than one device of the same type as the probable device, as in 212. If there is not more than one device of the same type as the probable device, then an analysis is used to derive a possible type and label for the device that the user wants to activate, as in 220. If there is more than one device of the same type as the probable device, then the system determines if there is a device of the same type as the probable device without a label, as in 214.

If there is a device of the same type as the probable device without a label, the the device without a label is switched on, as in 216. At 218, the system determines if the device without the label that was switched on is the correct device. For example, the user may verbally confirm that the device switched on is the correct device. If the device without the label that was switched on is the correct device, then the description of the device is learned or stored, as in 210. If the device without the label that was switched on is not the correct device, then analysis is used to to derive a possible type and label for the device that the user wants to activate, as in 220.

Going back to 214, if there is not a device of the same type as the probable device without a label, then analysis is used to derive a possible type and label for the device that the user wants to activate, as in 220. For example, the system may ask the user for more information to help identify the device, find a device with the most similar description, ask the user to manually switch the device on and off, change the state of the device, try another device is the same location or around the same location, etc. At 222, the system determines if the derived possible type and label for the device is correct. If the derived possible type and label are correct, then the description of the device is learned or stored, as in 210. If the derived possible type and label are not correct, then the system returns to 220 and further analysis is used to derive a possible type and label for the device that the user wants to activate.

Figure 3:
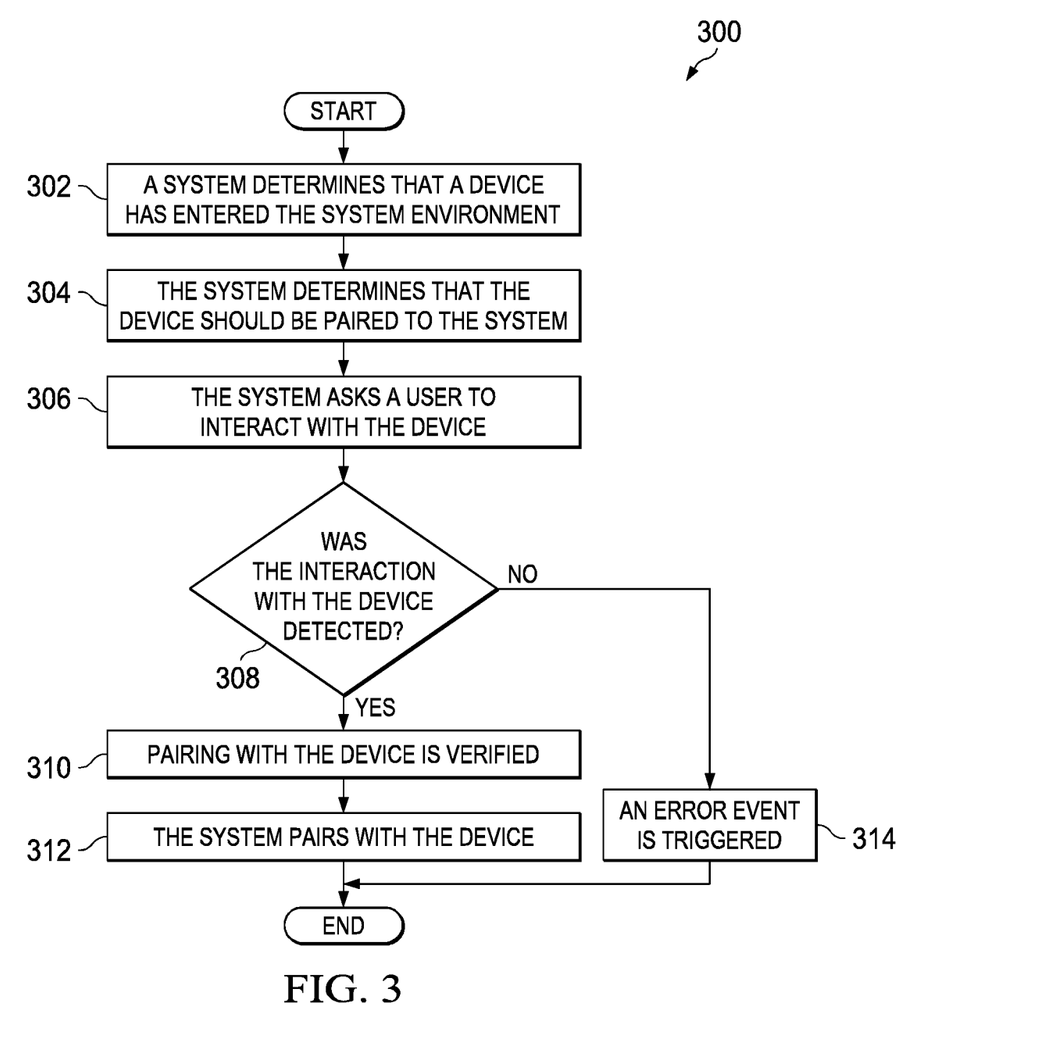
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with device identification through dialog, in accordance with an embodiment. In an embodiment, one or more operations of flow 300 may be performed by one or more of network controller 104, cloud services network controller 134, and server network controller 136. At 302, a system determines that a device has entered the system environment. For example, a device may have entered into network 106. At 304, the system determines that the device should be paired to the system. At 306, the system asks a user to interact with the device. For example, the user may turn on and off the device, change a state of the device, change a location of the device (e.g., if the device is on the wrist of a user, the user can move their arm), etc. At 308, the system determines if the interaction with the device was detected. If the interaction with the device was detected or successful, then pairing with the device is verified, as in 310. At 312, the system pairs with the device. For example, the system may determine a description for the device and store the description in memory. If the interaction with the device was not detected or successful, then an error event is triggered, as in 314. In an example, the error event can include disconnecting or un-pairing the device, sending an error message to a user, etc.

Figure 4:
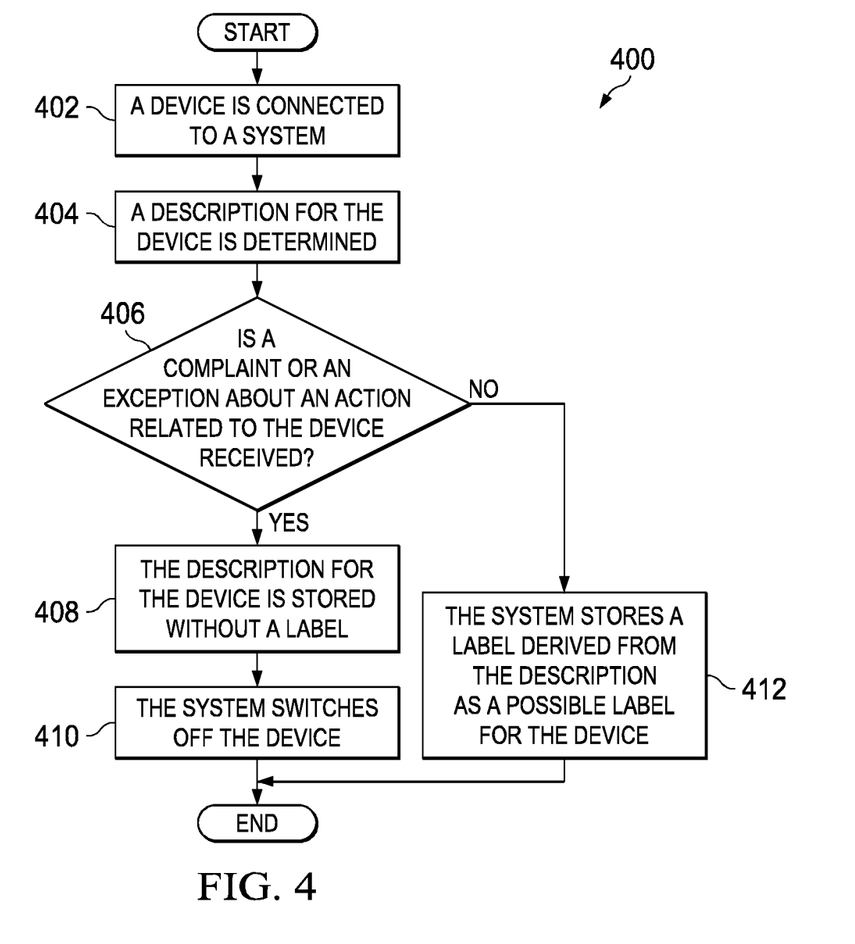
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with device identification through dialog, in accordance with an embodiment. In an embodiment, one or more operations of flow 400 may be performed by one or more of network controller 104, cloud services network controller 134, and server network controller 136. At 402, a device is connected to a system. In an example, when a device is connected to a system, the system (e.g., network controller 104) attempts to determine a description and an associated label for the device. At 404, a description for the device is determined. For example, a description given to electronic device 102a by a user (e.g., television in the living room) may be determined and stored in electronic device description 128a. At 406, the system determines if a complaint or an exception about an action related to the device was received. For example, a user could have said, "Turn on the television in the living room." If the system determines that a complaint or an exception about an action related to the device was not received (e.g., the television in the living room turned on as requested), then the system stores a label derived from the description as a possible label for the device. For example, the electronic device with the description of "television in the living room" may be queried for a label such as MAC address, IP address, etc. If the system determines that a complaint or an exception about an action related to the device was received (e.g., the television in the living room did not turn on as requested), then the description for the device is stored without a label, as in 408. At 410, the system switches off the device.

Figure 5:
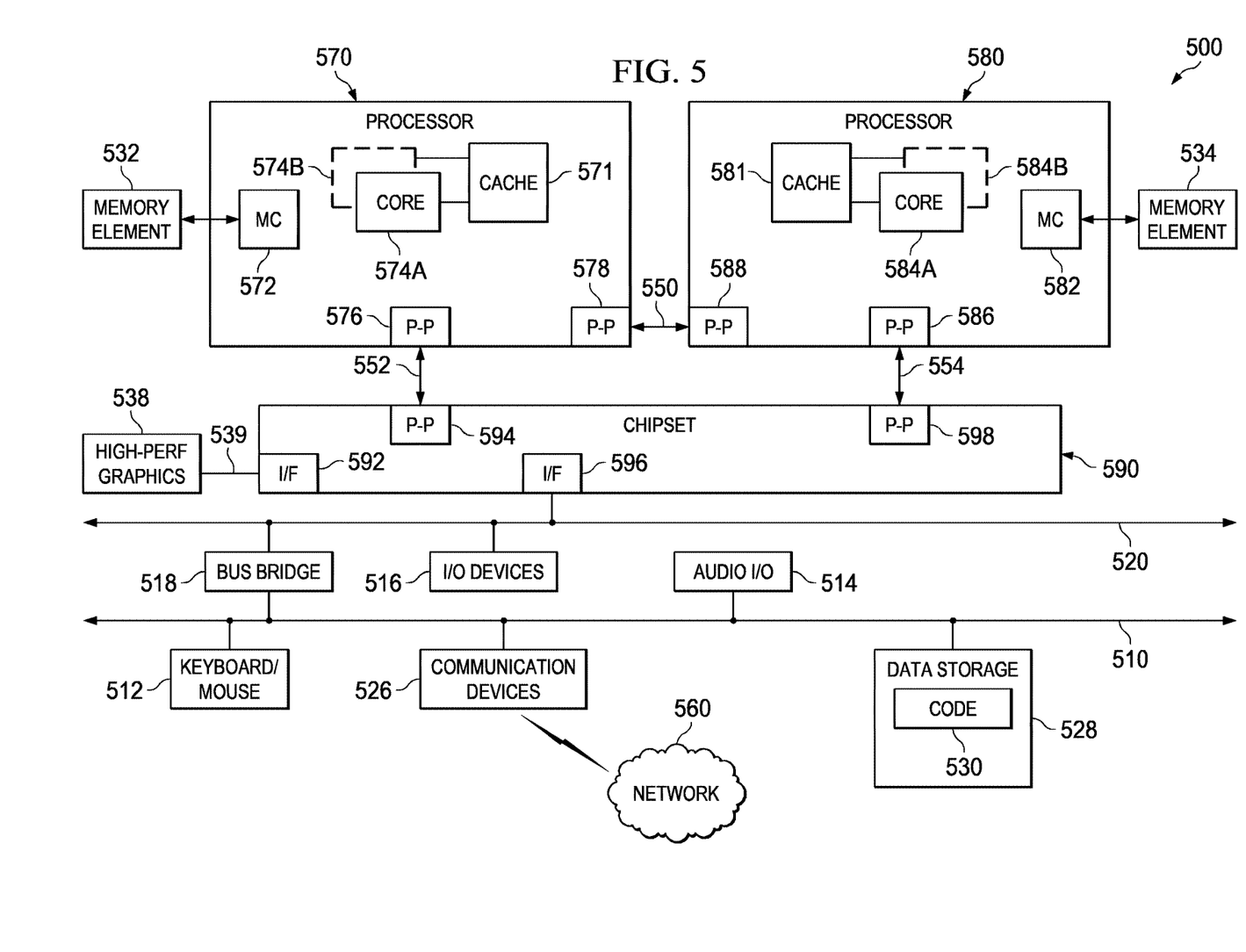
FIG. 5 is a block diagram illustrating an example computing system that is arranged in a point-to-point configuration in accordance with an embodiment.

Turning to FIG. 5, FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 2-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor, and may exchange data via a point-to-point (PtP) interface 550 using point-to-point interface circuits 578 and 588, respectively. Processors 570 and 580 may each exchange data with a control logic 590 via individual point-to-point interfaces 552 and 554 using point-to-point interface circuits 576, 586, 594, and 598. Control logic 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Control logic 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, internet-of-things devices, constrained devices (sensors, actuators, controllers), appliances, small wearables, health and quantified-self devices, industrial, devices, etc. It will be appreciated that these mobile devices may be provided with SoC architectures in at least some embodiments.

Figure 6:
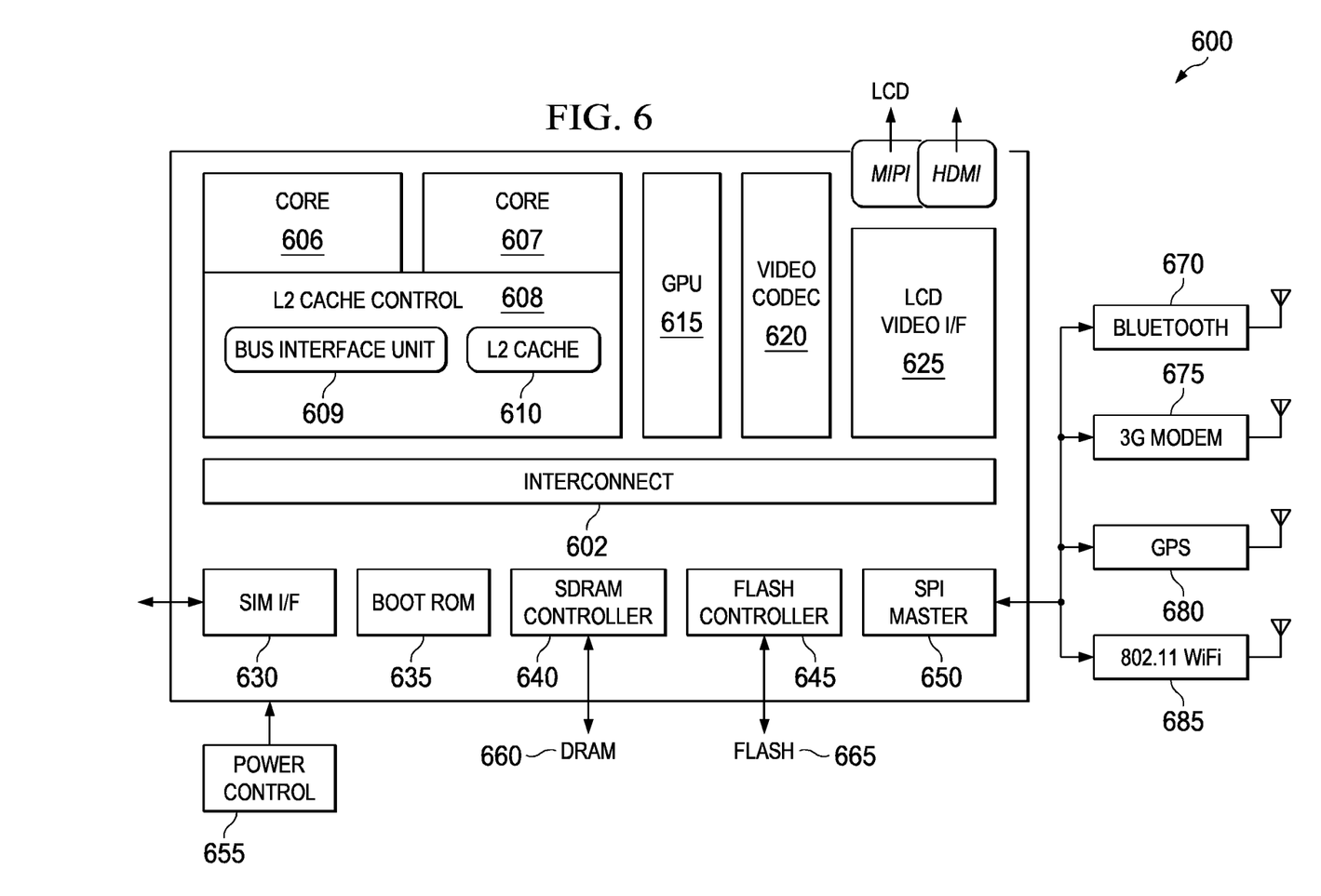
FIG. 6 is a simplified block diagram associated with an example ARM ecosystem system on chip (SOC) of the present disclosure.

Turning to FIG. 6, FIG. 6 is a simplified block diagram associated with an example SOC 600 of the present disclosure. At least one example implementation of the present disclosure can include the protected data collection features discussed herein. For example, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 6, SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 7:
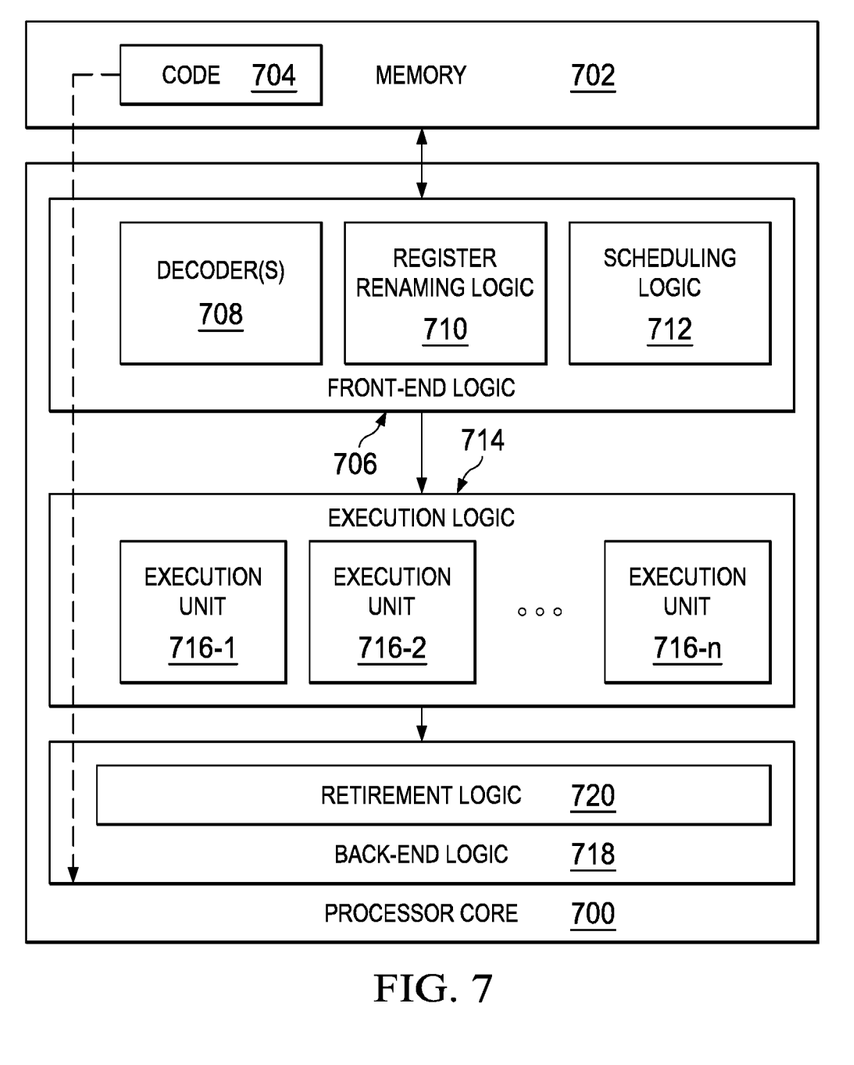
FIG. 7 is a block diagram illustrating an example processor core in accordance with an embodiment.

FIG. 7 illustrates a processor core 700 according to an embodiment. Processor core 7 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents an embodiment of processors cores 574a, 574b, 584a, and 584b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor cause the at least one processor to receive a verbal command to active a device with an unknown label, derive a probable device and a label for the probable device, activate the probable device, determine that the activated probable device is the same device to be activated by the verbal command, and store the label and a description for the device.

In Example C2, the subject matter of Example C1 can optionally include where where the label is provided by the device and is associated with the description.

In Example C3, the subject matter of any one of Examples C1-C2 can optionally include where the instructions, when executed by the at least one processor, further cause the at least one processor to determine a type associated with the device, wherein the probable device is at least partially derived from the type associated with the device.

In Example C4, the subject matter of any one of Examples C1-C3 can optionally include where the label is at least partially derived from the verbal command.

In Example C5, the subject matter of any one of Examples C1-C4 can optionally include where the instructions, when executed by the at least one processor, further cause the at least one processor to pair with the device.

In Example C6, the subject matter of any one of Examples C1-C5 can optionally include where the instructions, when executed by the at least one processor, further cause the at least one processor to receive a complaint about the device and unpair the device.

In Example C7, the subject matter of any one of Example C1-C6 can optionally include where activating the probable device includes turning on the device.

In Example A1, an apparatus can include a device label module, where the device label module is configured to receive a verbal command to active a device with an unknown label, derive a probable device and a label for the probable device, activate the probable device, determine that the activated probable device is the same device to be activated by the verbal command, and store the label and a description for the device.

In Example, A2, the subject matter of Example A1 can optionally include where the label is provided by the device and is associated with the description.

In Example A3, the subject matter of any one of Examples A1-A2 can optionally include where the device label module is further configured to determine a type associated with the device, wherein the probable device is at least partially derived from the type associated with the device.

In Example A4, the subject matter of any one of Examples A1-A3 can optionally include where the label is at least partially derived from the verbal command.

In Example A5, the subject matter of any one of Examples A1-A4 can optionally include where the device label module is further configured to pair with the device.

In Example A6, the subject matter of any one of Examples A1-A5 can optionally include where the device label module is further configured to receive a complaint about the device and unpair the device.

In Example A7, the subject matter of any one of Examples A1-A6 can optionally include where activating the probable device includes turning on the device.

Example M1 is a method including receiving a verbal command to active a device with an unknown label, deriving a probable device and a label for the probable device, activating the probable device, determining that the activated probable device is the same device to be activated by the verbal command, and storing the label and a description for the device.

In Example M2, the subject matter of Example M1 can optionally include where the label is provided by the device and is associated with the description.

In Example M3, the subject matter of any one of the Examples M1-M2 can optionally include determining a type associated with the device, wherein the probable device is at least partially derived from the type associated with the device.

In Example M4, the subject matter of any one of the Examples M1-M3 can optionally include where the label is at least partially derived from the verbal command.

In Example M5, the subject matter of any one of the Examples M1-M4 can optionally include pairing with the device.

In Example M6, the subject matter of any one of the Examples M1-M5 can optionally include where receiving a complaint about the device and unpairing the device.

In Example AA1, an apparatus can include means for receiving a verbal command to active a device with an unknown label, means for deriving a probable device and a label for the probable device, means for activating the probable device, means for determining that the activated probable device is the same device to be activated by the verbal command, and means for storing the label and a description for the device.

In Example, AA2, the subject matter of Example AA1 can optionally include means for receiving the label from the device and associating the label with the description.

In Example AA3, the subject matter of any one of Examples AA1-AA2 can optionally include means for determining a type associated with the device, wherein the probable device is at least partially derived from the type associated with the device.

In Example AA4, the subject matter of any one of Examples AA1-AA3 can optionally include where the label is at least partially derived from the verbal command.

In Example AA5, the subject matter of any one of Examples AA1-AA4 can optionally include where means for pairing with the device.

In Example AA6, the subject matter of any one of Examples AA1-AA5 can optionally include means for receiving a complaint about the device and unpairing the device.

In Example AA7, the subject matter of any one of Examples AA1-AA6 can optionally include where activating the probable device includes turning on the device.

Example S1 is a system for device name through dialog, the system including a a device label engine, where the device label engine is configured to receive a verbal command to active a device with an unknown description, derive a probable device and a label for the probable device, activate the probable device, determine that the activated probable device is the same device that the verbal command said to activate, and store a description for the device.

In Example S2, the subject matter of Example S1 can optionally include where the device label engine is further configured to store the label for the device, wherein the label is associated with the description.

In Example S3, the subject matter of any of the Examples S1-S2 can optionally include where the device label engine determine a type associated with the device, wherein the probable device is at least partially derived from the type associated with the device.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:

determine that a device has been added to a network, wherein the network includes a plurality of devices and each of the plurality of devices has a known description and a known label;

determine a label for the device;

receive a verbal command to active the device;

determine that the device to be activated by the verbal command is not one of a plurality of devices with a known description;

based on the verbal command, derive a probable device that could be the device to be activated by the verbal command;

activate the probable device;

determine if the activated probable device is the device to be activated by the verbal command;

if the activated probable device is the device to be activated by the verbal command, derive a description for the device, wherein the description is at least partially derived from the verbal command;

if the activated probable device is not the device to be activated by the verbal command, determine if a different device without a description that is a same type as the probable device; and activate the different device that is the same type as the probable device.

2. The at least one non-transitory machine readable medium of claim 1, wherein the label is provided by the device when the device was added to the network and the label is associated with the description.

3. The at least one non-transitory machine readable medium of claim 1, further comprising one or more instructions that when executed by the at least one processor, cause the at least one processor to:

determine a type associated with the device, wherein the probable device is at least partially derived from the type associated with the device.

4. The at least one non-transitory machine readable medium of claim 1, wherein activating the probable device includes changing a current state of the probable device.

5. The at least one machine readable medium of claim 1, wherein the label is a media access control address for the device or an internet protocol address associated with the device.

6. The at least non-transitory one machine readable medium of claim 1, further comprising one or more instructions that when executed by the at least one processor, cause the at least one processor to:

pair with the device.

7. The at least one non-transitory machine readable medium of claim 6, further comprising one or more instructions that when executed by the at least one processor, cause the at least one processor to:

receive a complaint about the device; and unpair the device.

8. An apparatus comprising:

memory;

a processor; and a device label module, wherein the device label module is configured to:

determine that a device has been added to a network, wherein the network includes a plurality of devices and each of the plurality of devices has a known description and a known label;

determine a label for the device;

receive a verbal command to active the device;

determine that the device to be activated by the verbal command is not one of a plurality of devices with a known description;

based on the verbal command, derive a probable device that could be the device to be activated by the verbal command;

activate the probable device;

determine if the activated probable device is the device to be activated by the verbal command;

if the activated probable device is the device to be activated by the verbal command, derive a description for the device, wherein the description is at least partially derived from the verbal command;

if the activated probable device is not the device to be activated by the verbal command, determine if a different device without a description that is a same type as the probable device; and activate the different device that is the same type as the probable device.

9. The apparatus of claim 8, wherein activating the probable device includes changing a current state of the device.

10. The apparatus of claim 8, wherein the device label module is further configured to:

determine a type associated with the device, wherein the probable device is at least partially derived from the type associated with the device.

11. The apparatus of claim 10, wherein the label for the device is a media access control address and was provided by the device when the device was added to the network.

12. The apparatus of claim 8, wherein the device label module is further configured to:

pair with the device.

13. The apparatus of claim 12, wherein the device label module is further configured to:

receive a complaint about the device; and unpair the device.

14. A method comprising:

determining that a device has been added to a network, wherein the network includes a plurality of devices and each of the plurality of devices has a known description and a known label;

determining a label for the device;

receiving a verbal command to active the device;

determining that the device to be activated by the verbal command is not one of a plurality of devices with a known description;

based on the verbal command, deriving a probable device that could be the device to be activated by the verbal command;

activating the probable device;

determining if the activated probable device is the device to be activated by the verbal command;

if the activated probable device is the device to be activated by the verbal command, deriving a description for the device, wherein the description is at least partially derived from the verbal command; and if the activated probable device is not the device to be activated by the verbal command, determining if a different device without a description that is a same type as the probable device; and activating the different device that is the same type as the probable device.

15. The method of claim 14, wherein the label is associated with the description.

16. The method of claim 14, further comprising:

determining a type associated with the device, wherein the probable device is at least partially derived from the type associated with the device.

17. The method of claim 16, wherein the label for the device is a media access control address or an internet protocol address.

18. The method of claim 14, further comprising:

pairing with the device.

19. The method of claim 18, further comprising:

receiving a complaint about the device; and unpairing the device.

* * * * *